Patented Apr. 21, 1931

1,801,965

UNITED STATES PATENT OFFICE

JEAN LICHTENBERGER, OF MULHOUSE, FRANCE

PROCESS FOR DECOLORIZING ACETONE AND METHYLENE OILS

No Drawing. Application filed December 1, 1926, Serial No. 152,064, and in France December 14, 1925.

It is known that the so-called acetone oils (boiling point 125°–200° C.) derived from the destructive distillation of calcium acetate, and the so-called methylene oils (boiling point 100°–200° C.) derived from the rectification of crude wood spirit, are of a dark yellow or yellowish brown color, which fact considerably limits their commercial use.

Fractional distillation is insufficient to render them colorless; the fractions obtained possess less color than that of the crude oil from which they are obtained, but they rapidly regain, especially on exposure to light, their original color.

Numerous attempts both physical and chemical, have been made with the object of rendering these oils colorless such as by treatment with absorbents (fuller's earth, kieselguhr, silica gel, etc.) or by treatment with strong mineral bases or strong acids, in particular hydrochloric acid whether in its gaseous state or in solution. Distillation with water steam has also been proposed for purifying purposes and treatment with sulphate of soda for desiccating purposes. These different methods, however, are either ineffective or have no effect whatever so far as the removal of color is concerned.

It has appeared to the inventor that the color of these oils (whose constitution is still little known) may be due to the presence of certain colorless or specifically yellow colored constituents (cyclic ketones, furan derivatives, etc.) which have a great tendency to condense and become polymerized either slowly or spontaneously with the formation of colored undistillable resins.

The invention has for its purpose to obtain the complete decolorizing of the acetone-oils and methylene-oils and furthermore to render them non-colorable afterwards. This purpose may be obtained by the action on said oils of anhydrous metallic chlorides, acting in an anhydrous medium, and particularly the chlorides of calcium, magnesium, zinc, aluminum, iron, tin or antimony, which action is followed in the absence of water steam.

To carry the invention into effect, it is only necessary to heat the crude oils together with a small percentage of a crushed anhydrous metallic chloride, (about 5%) under reflux for several hours at normal or raised pressures, and then to distil them at ordinary pressure or in vacuo; absolutely colorless oils are obtained which have no tendency to become colored on prolonged exposure to light.

This leaves in the distilling apparatus as residue undistillable resins in the form of tars, resins or pitch similar to the residue obtained by a simple distillation without decolorizing agents. The more volatile products may be eliminated in a colorless state during the heating under reflux by a suitable adjusting of the cooling produced in the reflux condenser.

It should be understood that the above treatment may be effected either with crude oils such as produced in manufacture or with fractions of such oils previously isolated by distillation.

It will also be understood that if it is desired to treat particularly dense or viscous oily fractions with which the crushed metallic chloride does not mix easily, this defect may be overcome by the use of an inert diluent not capable of entering into reaction with the condensing agent.

Example 1

In a steel vessel of about 400 cubic feet capacity provided with an indirect heating coil, and a condenser cooling by an upwardly or downwardly circulating refrigerating liquid, are introduced 200 kgs. of heavy acetone oil (boiling point 125°–200° C.) and 10 kgs. of coarsely pulverized anhydrous magnesium chloride.

The oil is brought to boiling point and raised to this temperature repeatedly during 3 to 4 hours, after which it is distilled at ordinary pressure until, on testing, a colorless and clear liquid is obtained having a characteristic fruity odour; a beautiful black hard brilliant pitch of conchoidal fracture is withdrawn while hot from the vessel.

Example 2

In a steel autoclave of about 400 litres capacity are introduced 200 kgs. of oil of methylene (the fraction obtained between 125° and 195° C.) and 10 kgs. of anhydrous ferric chloride.

The autoclave is heated in an oil bath for 2 to 3 hours and kept at a pressure of about 3 kgs. after which it is partially cooled to cause a fall in pressure; it is then connected to a refrigerator in which the refrigerating liquid circulates downwardly and the contents distilled until, on testing, a colorless clear liquid is obtained of characteristic bitter odour; a very viscous dark brown tar is withdrawn from the autoclave.

Under the designation "methylene-oils", as used in this specification, are those oils obtained as an end product in the rectification of crude wood-alcohol. Such oils are loosely termed scientifically as "methylene-oils", and are so known in the trade. The nature of the "methylene-oils", referred to may be understood clearly by the data given in the specification, to wit, the oils being of yellow-brown color and boiling between 100° and 200° C.

It should be understood that modifications of detail may be made of this process without departing from the scope of the invention.

What I claim is:—

1. A process for decolorizing acetone-oils which consists in treating such oils, while heated to the boiling point under reflux, with an anhydrous metallic chloride.

2. A process for decolorizing acetone-oils which consists in treating such oils, while heated to the boiling point under reflux, with a crushed anhydrous metallic chloride.

3. A process for decolorizing acetone-oils which consists in boiling such oils under reflux with an anhydrous metallic chloride, and then subjecting the mixture to distillation.

4. A process for decolorizing acetone-oils or the like, which consists in treating such oils, while heated to the boiling point under reflux, with anhydrous magnesium chloride.

In testimony whereof I have affixed my signature.

JEAN LICHTENBERGER.